United States Patent
Nakamura et al.

(10) Patent No.: US 10,384,726 B1
(45) Date of Patent: Aug. 20, 2019

(54) SIDE-BY-SIDE VEHICLE

(71) Applicant: KAWASAKI JUKOGYO KABUSHIKI KAISHA, Kobe-shi, Hyogo (JP)

(72) Inventors: Kenta Nakamura, Kobe (JP); Itsuo Takegami, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 0 days.

(21) Appl. No.: 16/228,271

(22) Filed: Dec. 20, 2018

Related U.S. Application Data

(63) Continuation-in-part of application No. 15/928,990, filed on Mar. 22, 2018, now Pat. No. 10,202,151.

(51) Int. Cl.
| | |
|---|---|
| *B62D 33/02* | (2006.01) |
| *B62D 25/24* | (2006.01) |
| *B62D 21/18* | (2006.01) |
| *B62D 25/08* | (2006.01) |

(52) U.S. Cl.
CPC ........... *B62D 25/24* (2013.01); *B62D 21/183* (2013.01); *B62D 25/087* (2013.01)

(58) Field of Classification Search
CPC ........ B62D 33/02; B62D 33/023; B60P 3/426
See application file for complete search history.

(56) References Cited

U.S. PATENT DOCUMENTS

| | | | |
|---|---|---|---|
| 7,287,769 B2 | 10/2007 | Thiemke et al. | |
| 7,396,066 B2 * | 7/2008 | Houston | B60P 3/423 296/182.1 |
| 8,167,351 B2 | 5/2012 | Plowman | |
| 8,534,747 B2 | 9/2013 | Thurmon | |
| 8,613,336 B2 | 12/2013 | Deckard et al. | |
| 8,746,394 B2 * | 6/2014 | Kuramoto | B60K 5/02 180/292 |
| 9,211,924 B2 | 12/2015 | Safranski et al. | |
| 10,112,659 B2 * | 10/2018 | Tsumiyama | B62D 33/02 |
| 10,202,151 B1 * | 2/2019 | Nakamura | B62D 25/12 |
| 2004/0031639 A1 | 2/2004 | Deves et al. | |
| 2004/0195018 A1 | 10/2004 | Inui et al. | |
| 2004/0195019 A1 | 10/2004 | Kato et al. | |
| 2004/0195034 A1 | 10/2004 | Kato et al. | |
| 2004/0231900 A1 | 11/2004 | Tanaka et al. | |

(Continued)

*Primary Examiner* — Bryan A Evans
(74) *Attorney, Agent, or Firm* — Alleman Hall Creasman & Tuttle LLP

(57) ABSTRACT

A side-by-side vehicle includes a vehicle body frame; a driving power unit supported by the vehicle body frame; and a cargo carrier which is disposed above the driving power unit and has a loading space. The cargo carrier includes a bottom wall defining a bottom surface of the loading space. The bottom wall includes a center bottom wall portion, a rear bottom wall portion provided rearward of the center bottom wall portion and configured to be higher than the center bottom wall portion, and a protruding wall portion protruding upward from a rear end of the center bottom wall portion and connected to a front end of the rear bottom wall portion. The protruding wall portion is provided with a drain hole through which a space formed above the center bottom wall portion is in communication with a space formed under the rear bottom wall portion.

8 Claims, 13 Drawing Sheets

(56) References Cited

U.S. PATENT DOCUMENTS

| | | | |
|---|---|---|---|
| 2005/0057062 A1* | 3/2005 | McClure | B60R 13/01 |
| | | | 296/37.6 |
| 2008/0136215 A1* | 6/2008 | Houston | B60P 3/423 |
| | | | 296/186.1 |
| 2012/0031694 A1 | 2/2012 | Deckard et al. | |
| 2014/0265412 A1* | 9/2014 | Ellis | B60R 9/00 |
| | | | 296/39.2 |
| 2016/0280145 A1 | 9/2016 | Vertanen | |
| 2018/0170218 A1 | 6/2018 | Nowland | |
| 2018/0186270 A1* | 7/2018 | Tsumiyama | B60P 1/28 |
| 2018/0186413 A1* | 7/2018 | Tsumiyama | B62D 33/02 |

* cited by examiner

SIDE-BY-SIDE VEHICLE

CROSS REFERENCE TO RELATED APPLICATIONS

This patent application is a continuation-in-part of and claims priority to U.S. patent application Ser. No. 15/928,990, entitled SIDE-BY-SIDE VEHICLE, filed Mar. 22, 2018, the entire disclosure of which is hereby incorporated herein by reference for all purposes.

BACKGROUND OF THE INVENTION

Field of the Invention

The present invention relates to a side-by-side vehicle including a cargo carrier.

Description of the Related Art

For example, U.S. Pat. No. 8,613,336 discloses a side-by-side vehicle of a four-wheel-drive type which travels off-road. This vehicle includes a riding space in which a driver seat and a passenger seat are provided, and which is surrounded by a cabin frame, a cargo carrier (cargo carrying portion) disposed rearward of the riding space, an engine, a CVT, and others which are disposed below the cargo carrier.

The cargo carrier is exposed outside the vehicle. There is a possibility that rain water or the like is accumulated in a loading space of the cargo carrier. In a case where a drain hole is provided in the bottom surface of the cargo carrier to discharge (drain) liquid accumulated in the loading space, the liquid discharged through the drain hole may adhere onto an engine or the like placed under the cargo carrier.

SUMMARY OF THE INVENTION

In view of the above-described circumstances, an object of the present invention is to provide a configuration for suitably discharging liquid accumulated in a loading space of a cargo carrier while preventing the liquid from adhering onto a driving power unit or the like.

According to an aspect of the present invention, a side-by-side vehicle comprises a vehicle body frame including a cabin frame section surrounding a riding space in which seats for a driver and a passenger are provided, and a rear frame section disposed rearward of the cabin frame section; a driving power unit supported by the vehicle body frame; and a cargo carrier which is disposed above the driving power unit in a state in which the cargo carrier is supported by the rear frame section, and has a loading space with a depressed shape, wherein the cargo carrier includes a bottom wall defining a bottom surface of the loading space, wherein the bottom wall includes a center bottom wall portion, a rear bottom wall portion provided rearward of the center bottom wall portion and configured to be higher than the center bottom wall portion, and a protruding wall portion protruding upward from a rear end of the center bottom wall portion and connected to a front end of the rear bottom wall portion, and wherein the protruding wall portion is provided with a drain hole through which a space formed above the center bottom wall portion is in communication with a space formed under the rear bottom wall portion.

In accordance with this configuration, the liquid accumulated in the loading space of the cargo carrier is discharged in the rearward direction through the drain hole formed in the protruding wall portion provided rearward of the center bottom wall portion. Therefore, it becomes possible to discharge the liquid accumulated in the loading space of the cargo carrier in the rearward direction to a region that is rearward of the driving power unit, and to prevent the liquid from adhering onto the driving power unit.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, reference embodiment and the embodiment of the present invention will be described with reference to the drawings.

Figure 1:
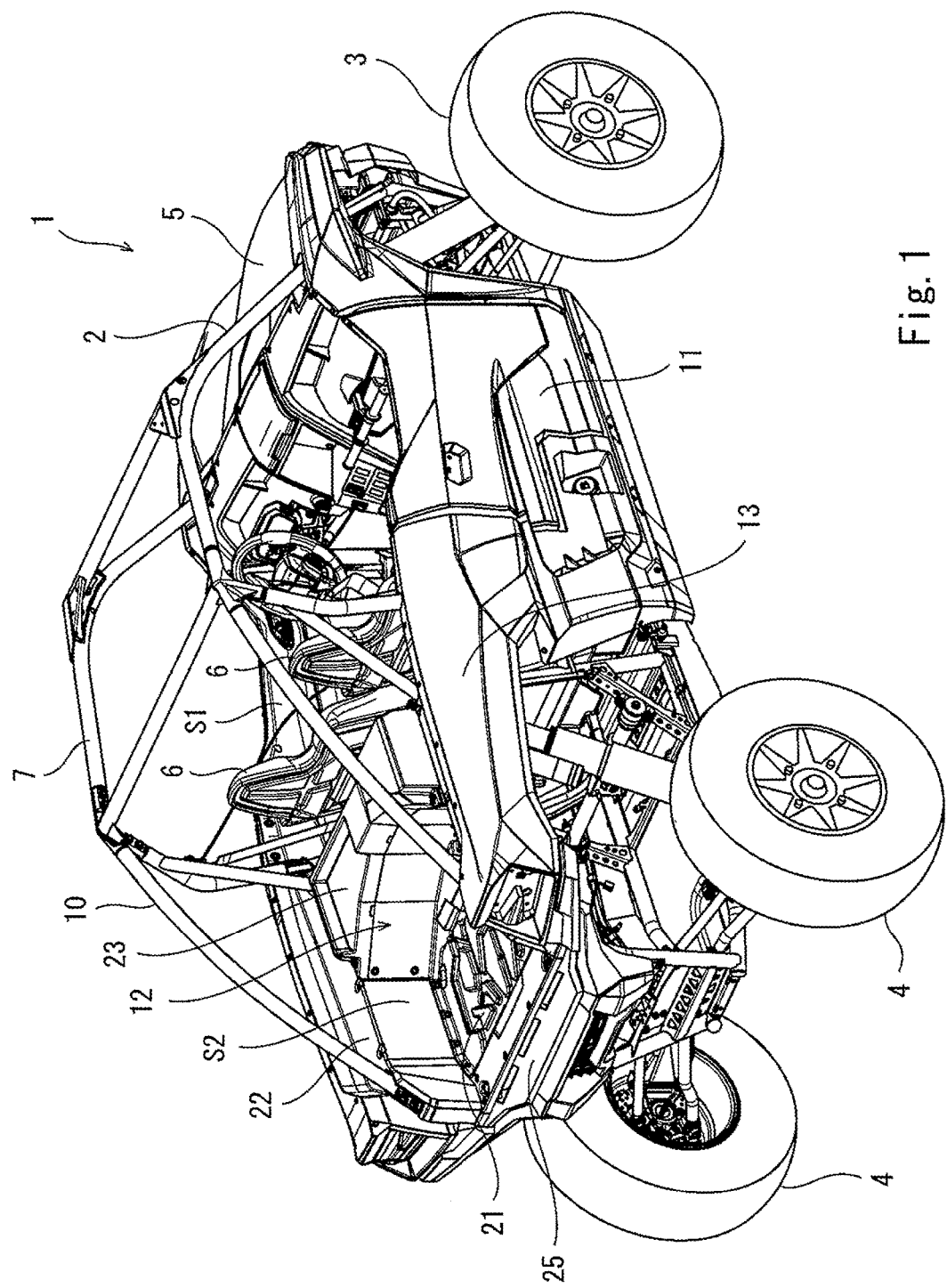
FIG. 1 is a perspective view showing a side-by-side vehicle (vehicle) according to a reference embodiment.
Figure 2:
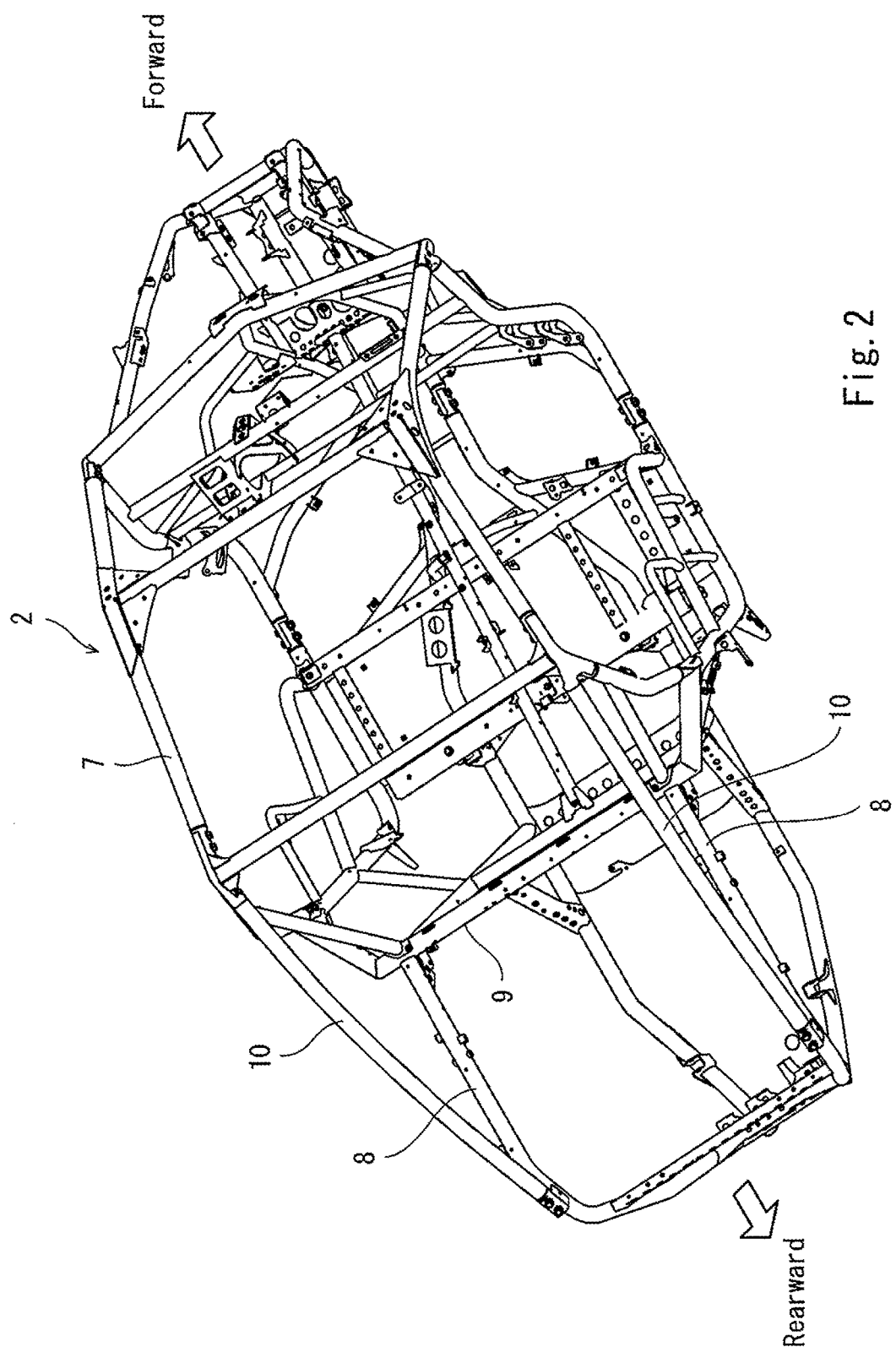
FIG. 2 is a perspective view showing a frame structure of the vehicle of FIG. 1.
Figure 3:
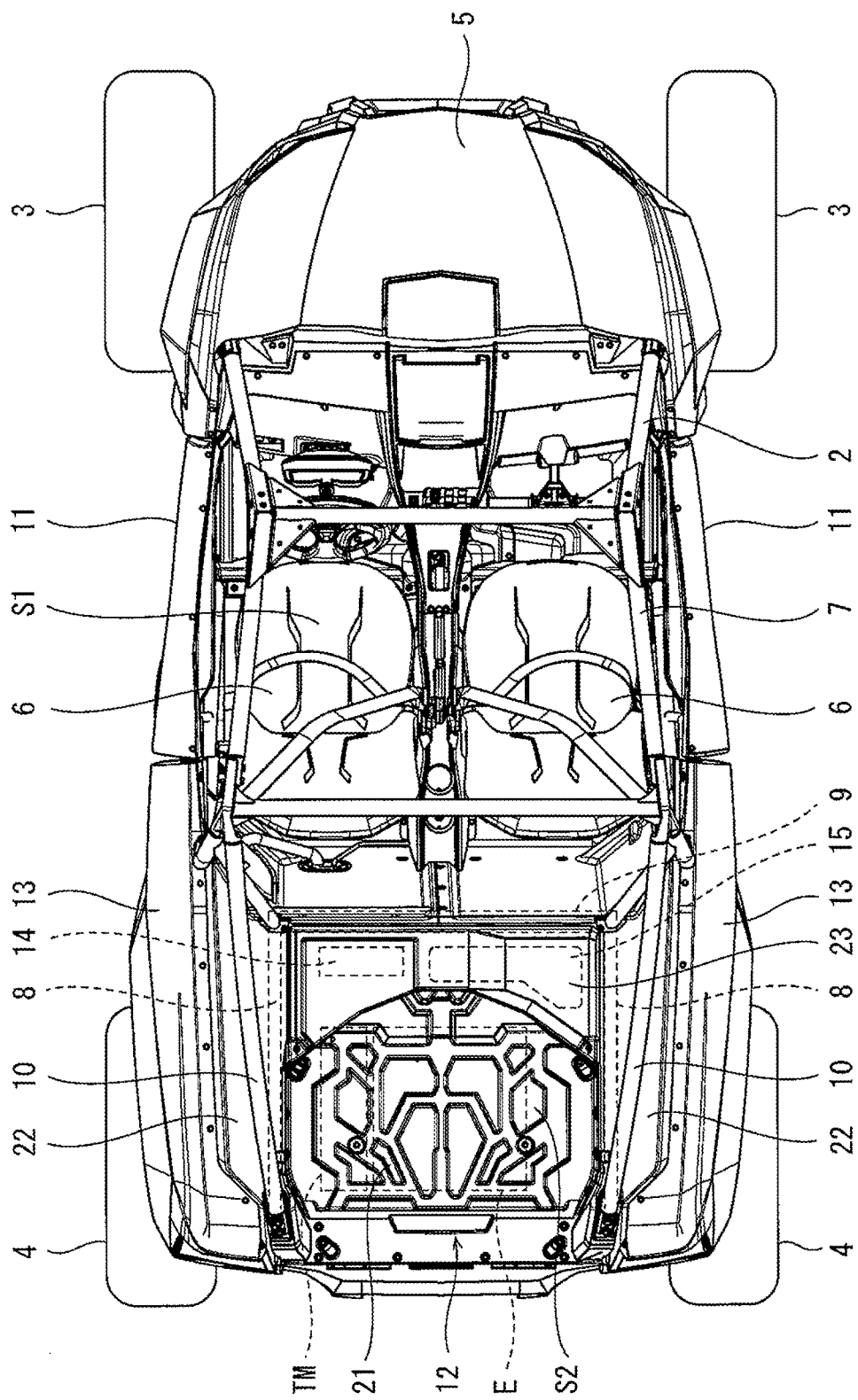
FIG. 3 is a plan view showing the vehicle of FIG. 1, when viewed from above.

FIG. 1 is a perspective view showing a side-by-side vehicle 1 (hereinafter will be simply referred to as the vehicle 1) according to the reference embodiment. FIG. 2 is a perspective view showing a frame structure of the vehicle 1 of FIG. 1. FIG. 3 is a plan view showing the vehicle 1 of FIG. 1, when viewed from above. Referring now to FIGS. 1 and 3, the vehicle 1 includes a pair of right and left front wheels 3 supported by (mounted on) the front portion of a vehicle body frame 2, and a pair of right and left rear wheels 4 supported by the rear portion of the vehicle body frame 2. A space formed between the right and left front wheels 3 is covered by a resin-made hood 5 from above. A pair of seats 6 (a driver seat and a passenger seat) are arranged side by side, at a location that is rearward of the hood 5, and is in the vicinity of the center of the vehicle body frame 2 in a forward and rearward direction.

As shown in FIGS. 1 to 3, the vehicle body frame 2 includes, for example, a cabin frame section 7, a pair of right and left rear frame sections 8, a cross frame section 9, and a pair of right and left rear gusset frame sections 10. The vehicle body frame 2 is a pipe frame including a plurality of pipe members coupled to each other. The cabin frame section 7 is disposed to surround a riding space 51 in which the seats 6 are provided The pair of right and left rear frame sections 8 are disposed on right and left sides at a location that is rearward of the cabin frame section 7, and extend rearward. The cross frame section 9 is disposed rearward of the cabin frame section 7 and couples the front end portions of the pair of right and left rear frame sections 8 to each other. The pair of right and left rear gusset frame sections 10 couple the upper portions of the cabin frame section 7 to the rear portions of the pair of right and left rear frame sections 8, respectively.

Resin-made doors 11 are disposed on right and left sides of the seats 6 to allow a rider and a passenger to get into and out of the vehicle 1. A resin-made cargo carrier 12 is disposed behind the seats 6 and has a loading space S2 with a depressed (recessed) shape. A pair of right and left rear fenders 13 which are made of a resin are disposed on right and left sides of the cargo carrier 12 at a location that is above the rear wheels 4. The front ends of the rear fenders 13 are close to and face the rear ends of the doors 11, respectively. The outer surfaces of the rear fenders 13 in the vehicle width direction are coplanar with the outer surfaces of the doors 11 in the vehicle width direction, respectively.

The cargo carrier 12 includes a base carrier member 21, a pair of right and left side carrier members 22, and a front carrier member 23. In other words, the cargo carrier 4 has a separable structure including four members which are separably joined to each other. The base carrier member 21 mainly forms the bottom surface and front surface of the loading space S. The pair of right and left side carrier members 22 are disposed on right and left sides of the base carrier member 21 and mainly form the side surfaces of the loading space S2. The front carrier member 23 is disposed in front of the base carrier member 21 and mainly forms the upper portion of the front surface of the loading space S2.

The base carrier member 21 covers from above an engine (driving power unit) E and a continuously variable transmission (CVT) TM which are supported by (mounted on) the vehicle body frame 2. The side carrier members 22 cover the rear frame sections 8 from above and are fastened to the rear frame sections 8, respectively. Openings 22e are formed in the rear portions of the side carrier members 22, respectively, to expose the rear portions of the rear frame sections 8. The rear portions of the rear gusset frame sections 10 extend through the openings 22e of the side carrier members 22 and are fastened to the rear portions of the rear frame sections 8, respectively. A battery 14 and an air cleaner box 15 are disposed in front of the base carrier member 21. The battery 14 is an electric power supply for in-vehicle devices. The air cleaner box 15 serves to clean air (intake air) to be supplied to the engine E. The battery 14 and the air cleaner box 15 are arranged side by side in a rightward and leftward direction. The battery 14 and the air cleaner box 15 are covered by the front carrier member 23 from above. The side carrier members 22 extend in the forward and rearward direction from a location corresponding to the front end of the front carrier member 23 to a location corresponding to the rear end of the base carrier member 21.

Figure 4:
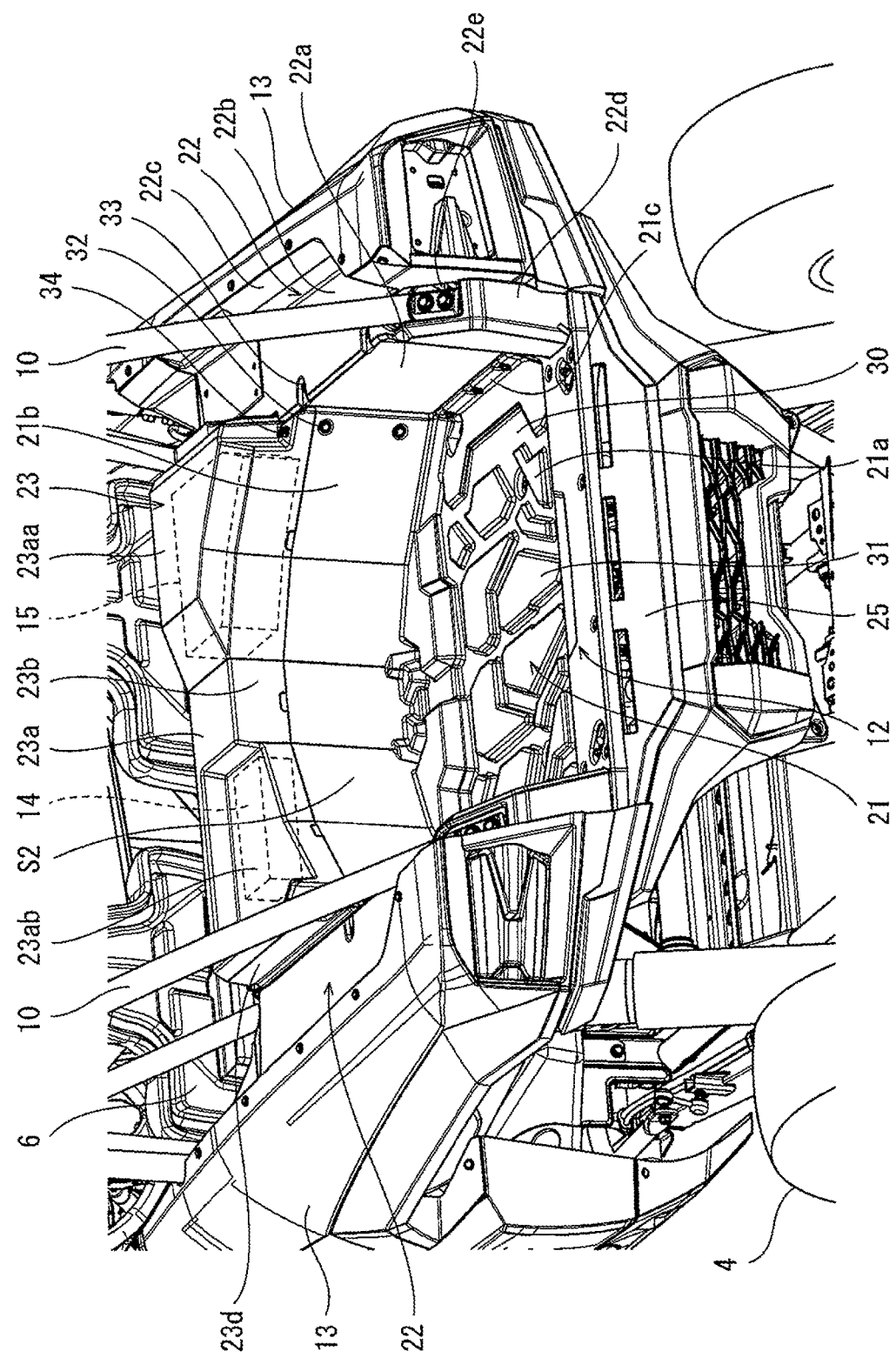
FIG. 4 is a perspective view showing a cargo carrier of the vehicle of FIG. 1.

FIG. 4 is a perspective view showing the cargo carrier 12 of the vehicle 1 of FIG. 1. As shown in FIG. 4, the cargo carrier 12 has the loading space S2 defined by the bottom surface, the front surface, the left side surface and the right side surface, by joining the base carrier member 21, the pair of right and left side carrier members 22, and the front carrier member 23 to each other. The loading space S2 opens upward and rearward. The base carrier member 21, the pair of right and left side carrier members 22, and the front carrier member 23 are fastened to the vehicle body frame 2 (or brackets mounted on the vehicle body frame 2) by fastening members 32 to 34 such as rivets.

The base carrier member 21 includes a bottom wall portion 21a, a front wall portion 21b, and a pair of right and left side wall portions 21c. The bottom wall portion 21a is the bottom surface of the loading space S2. The bottom wall portion 21a has a concave/convex structure including a depressed (recessed) region 30, and a plurality of convex (protruding) portions 31 protruding from the depressed region 30 in such a manner that the plurality of convex portions 31 are spaced apart from each other. This concave/convex structure is provided in most of the bottom wall portion 21a including a center. The front wall portion 21b protrudes upward from the front end of the bottom wall portion 21a. When viewed from above (in a plan view) (see FIG. 3), the front wall portion 21b has a shape in which it protrudes forward, as a whole. More specifically, when viewed from above, the front wall portion 21b has a substantially circular-arc shape. The pair of right and left side wall portions 21c protrude upward from the right end and left end, respectively, of the bottom wall portion 21a. The upper ends of the pair of right and left side wall portions 21c are lower than the upper end of the front wall portion 21b. The height of the pair of right and left side wall portions 21c is, for example, 5 to 50%, preferably, 10 to 30% of the height of the front wall portion 21b. The front ends of the pair of right and left side wall portions 21c are connected to the lower portion of the front wall portion 21b.

Each of the pair of right and left side carrier members 22 includes a side wall portion 22a, an upper wall portion 22b, an outer end wall portion 22c, and a rear wall portion 22d. The lower end portion of each of the side wall portions 22a is connected to the upper end portion of the side wall portion 21c of the base carrier member 21 and forms the side surface of the loading space S2. The upper wall portion 22b protrudes outward in the vehicle width direction (rightward and leftward direction) from the upper end of the side wall portion 22a. The upper surface of the upper wall portion 22b is a horizontal surface. The outer end wall portion 22c protrudes upward from the outer end of the upper wall portion 22b in the vehicle width direction. The upper end of the outer end wall portion 22c is connected to the rear fender 13. The rear wall portion 22d is connected to the rear end of the side wall portion 22a and the rear end of the upper wall portion 22b. Each of the pair of right and left side carrier members 22 (the upper wall portion 22b and/or the rear wall portion 22d) is formed with an opening 22e for allowing the rear portion of the rear gusset frame section 10 (see FIG. 1) to be coupled to the rear portion of the rear frame section 8.

The front carrier member 23 includes an upper wall portion 23a, a rear wall portion 23b, a front wall portion 23c, and a pair of right and left side wall portions 23d. The front carrier member 23 extends in the rightward and leftward direction, from a location corresponding to the left end of the base carrier member 21 to a location corresponding to the right end of the base carrier member 21, on a front side of the base carrier member 21. The upper wall portion 23a is disposed above the battery 14 and the air cleaner box 15. The upper end of the air cleaner box 15 is higher than the upper end of the battery 14. In this structure, a region (namely, right section 23aa) of the upper wall portion 23a which is right (immediately) above the air cleaner box 15 is higher than a region (left section 23ab) of the upper wall portion 23a which is right above the battery 14.

The rear wall portion 23b of the front carrier member 23 protrudes downward from the rear end of the upper wall portion 23a. When viewed from above (in a plan view), the rear wall portion 23b has a shape in which it protrudes forward, as a whole. Specifically, when viewed from above, the rear wall portion 23b has a substantially circular-arc shape. The rear wall portion 23b of the front carrier member 23 is coplanar (flush) with the front wall portion 21b of the base carrier member 21, and is connected to the upper end portion of the front wall portion 21b of the base carrier member 21. In this structure, the rear wall portion 23b of the front carrier member 23 and the front wall portion 21b of the base carrier member 21 define the front surface of the loading space S2. The front wall portion 23c of the front carrier member 23 protrudes downward from the front end of the upper wall portion 23a (see FIG. 6). The pair of right and left side wall portions 23d protrude downward from the right end and left end, respectively, of the upper wall portion 23a, and are connected to the rear wall portion 23b and the front wall portion 23c. The rear surface of the air cleaner box 15 has a shape (e.g., circular-arc shape) conforming to that of the rear wall portion 23b of the front carrier member 23.

A tail cover 25 is provided under the rear portion of the bottom wall portion 21a of the base carrier member 21. The tail cover 25 covers a space formed under the cargo carrier 12, from the rear. The upper portion of the tail cover 25 is in contact with the rear portion of the bottom wall portion 21a of the base carrier member 21, from below.

Figure 5:
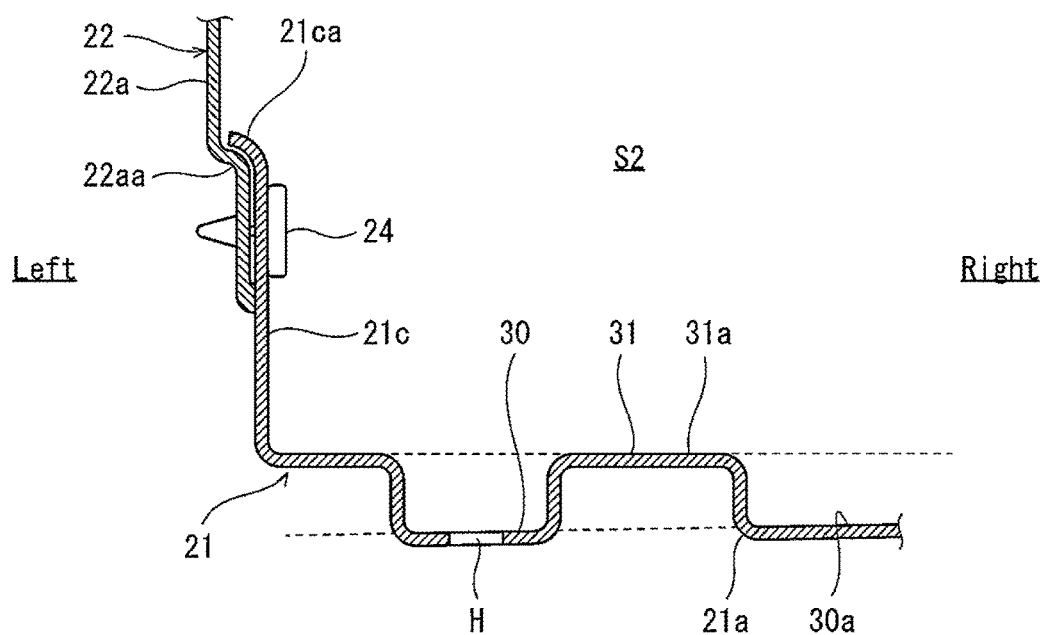
FIG. 5 is a cross-sectional view showing a fastening portion at which a base carrier member and a side carrier member of the cargo carrier of FIG. 3 are fastened to each other, and a region which is in the vicinity of the fastening portion.

FIG. 5 is a cross-sectional view showing a fastening portion at which the base carrier member 21 and the side carrier member 22 of the cargo carrier of FIG. 3 are fastened to each other, and a region which is in the vicinity of the fastening portion. As shown in FIG. 5, each of the pair of right and left side wall portions 21c of the base carrier member 21 is removably fastened to the side wall portion 22a of the side carrier member 22 by a fastening member 24 such as a rivet, in a state in which the side wall portion 21c is lapped on the side wall portion 22c from the loading space S2 side. The lower end portion of the side wall portion 22a of the side carrier member 22 is formed with a stepped portion 22aa protruding toward the loading space S2. The upper end portion of the side wall portion 21c of the base carrier member 21 is formed with a curved portion 21ca protruding away from the loading space S2 in such a manner that the curved portion 21ca conforms in shape to the stepped portion 22aa. In this structure, the base carrier member 21 can be easily aligned with each of the side carrier members 22. In addition, the base carrier member 21 can be easily dismounted (detached) from each of the side carrier members 22.

As described above, the bottom wall portion 21a of the base carrier member 21 has the concave/convex structure. The depressed region 30 of the bottom wall portion 21a is formed with a drain hole H at a location that is apart from the engine E in the rightward and leftward direction, in a plan view. In the present embodiment, the drain hole H is provided at a location that is in front of and lateral of the engine E (rightward or leftward of the engine E) in a plan view. The bottom surface 30a of the depressed region 30 is an inclined surface which is slightly inclined toward the drain hole H. In contrast, the upper surfaces 31a of the plurality of convex portions 31 are horizontal surfaces arranged on the same plane. Therefore, the bottom surface 30a of the depressed region 30 and the upper surfaces 31a of the convex portions 31 are not parallel to each other. Although the depressed region 30 is apparently partitioned by the convex portions 31, in the example of FIG. 5, the plurality of convex portions 31 are actually arranged like lands, and thus the depressed region 30 has a labyrinth structure as shown in FIG. 4.

Figure 6:
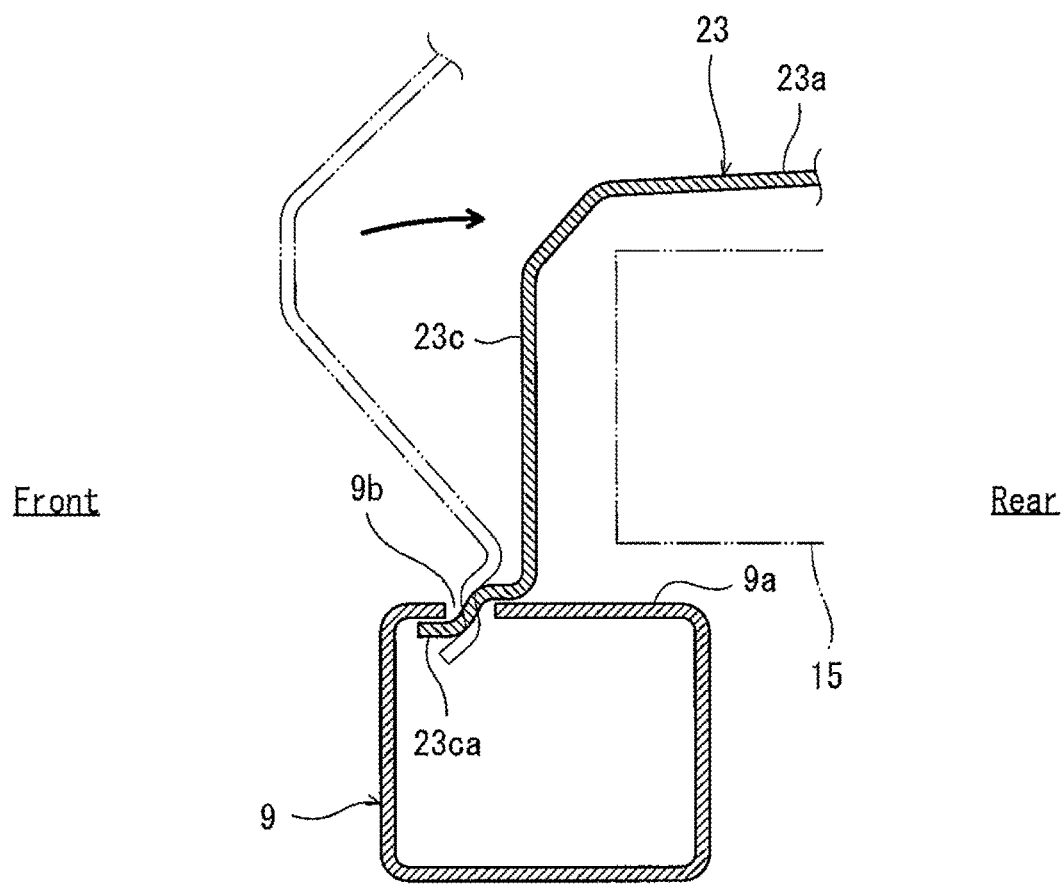
FIG. 6 is a cross-sectional view showing an engagement portion at which a front carrier member and a cross frame section are engaged with each other, and a region which is in the vicinity of the engagement portion, when viewed from the side (in a side view).
Figure 7:
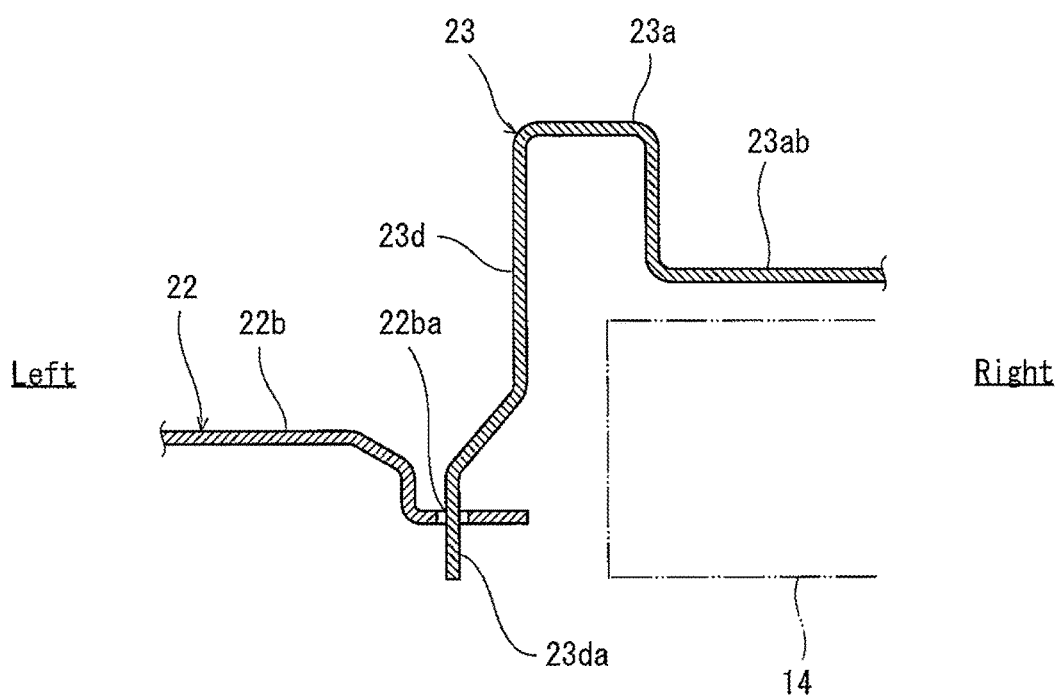
FIG. 7 is a cross-sectional view showing an engagement portion at which the front carrier member and the side carrier member are engaged with each other, and a region which is in the vicinity of the engagement portion when viewed from the rear (in a rear view).
Figure 8:
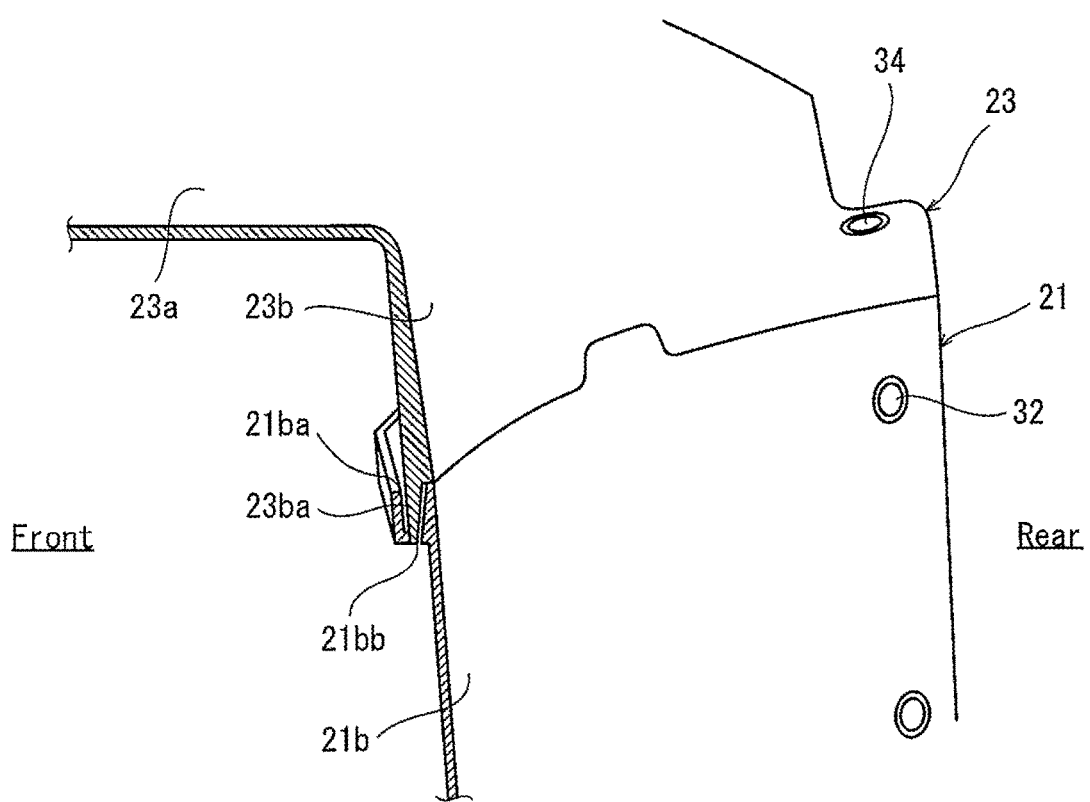
FIG. 8 is a cross-sectional perspective view showing an engagement portion at which the front carrier member and the base carrier member are engaged with each other, and a region which is in the vicinity of the engagement portion, when viewed from the side (in a side view).

FIG. 6 is a cross-sectional view showing an engagement portion at which the front carrier member 23 and the cross frame section 9 are engaged with each other, and a region which is in the vicinity of the engagement portion, when viewed from the side (in a side view). FIG. 7 is a cross-sectional view showing an engagement portion at which the front carrier member 23 and the side carrier member 22 are engaged with each other, and a region which is in the vicinity of the engagement portion, when viewed from the rear (in a rear view). FIG. 8 is a cross-sectional perspective view showing an engagement portion at which the front carrier member 23 and the base carrier member 21 are engaged with each other, and a region which is in the vicinity of the engagement portion, when viewed from the side. As shown in FIG. 6, the cross frame section 9 is a rectangular pipe, and an upper plate portion 9a of the cross frame section 9 is formed with a slit 9b (engaged portion). The slit 9b is located at a distance from the front end of the upper plate portion 9a.

An engagement portion 23ca protruding forward is formed in the lower end portion of the front wall portion 23c of the front carrier member 23. In a case where the front carrier member 23 is mounted on the cross frame section 9, the front carrier member 23 is tilted forward, then the engagement portion 23ca of the front carrier member 23 is inserted into the slit 9b of the cross frame section 9 (see two-dotted line of FIG. 6), and then the front carrier member 23 is tilted backward (rearward). In this way, the engagement portion 23ca of the front carrier member 23 is engaged with the cross frame section 9 while preventing the engagement portion 23ca from being disengaged from the slit 9b.

As shown in FIG. 7, a slit 22ba is formed in a portion of the upper wall portion 22b of the side carrier member 22, the portion corresponding to the side wall portion 23d of the front carrier member 23. An engagement portion 23da protruding downward is formed in the lower end portion of the side wall portion 23d of the front carrier member 23. This engagement portion 23da is inserted into the slit 22ba of the side carrier member 22, and thus the front carrier member 23 is positioned with respect to each of the side carrier members 22.

As shown in FIG. 8, a groove 21ba which opens upward is formed in the upper end portion of the front wall portion 21b of the base carrier member 21. A tapered engagement portion 23ba with a dimension reduced in the downward direction protrudes downward from the lower end portion of the rear wall portion 23b of the front carrier member 23. This engagement portion 23ba is inserted into the groove 21ba from above, and thus the front carrier member 23 is positioned with respect to the base carrier member 21. An engaged hole 21bb is formed on the bottom surface of the groove 21*ba*. The tapered engagement portion 23*ba* protruding downward from the lower end portion of the rear wall portion 23*b* of the front carrier member 23 is inserted into the engaged hole 21*bb*. In this way, the front carrier member 23 is precisely positioned with respect to the base carrier member 21. In this state, the rear surface of the rear wall portion 23*b* of the front carrier member 23 and the rear surface of the front wall portion 21*b* of the base carrier member 21 are coplanar with each other.

In the above-described manner, the front carrier member 23 is engaged with the cross frame section 9, the base carrier member 21, and the side carrier members 22. Portions of the front carrier member 23 which are close to the vehicle body frame 2 are fastened to the vehicle body frame 2 (or the brackets fastened to the vehicle body frame 2) by fastening members 34. Portions of the base carrier member 21 which are close to the vehicle body frame 2 are fastened to the vehicle body frame 2 (or the brackets fastened to the vehicle body frame 2) by fastening members 32.

Figure 9:
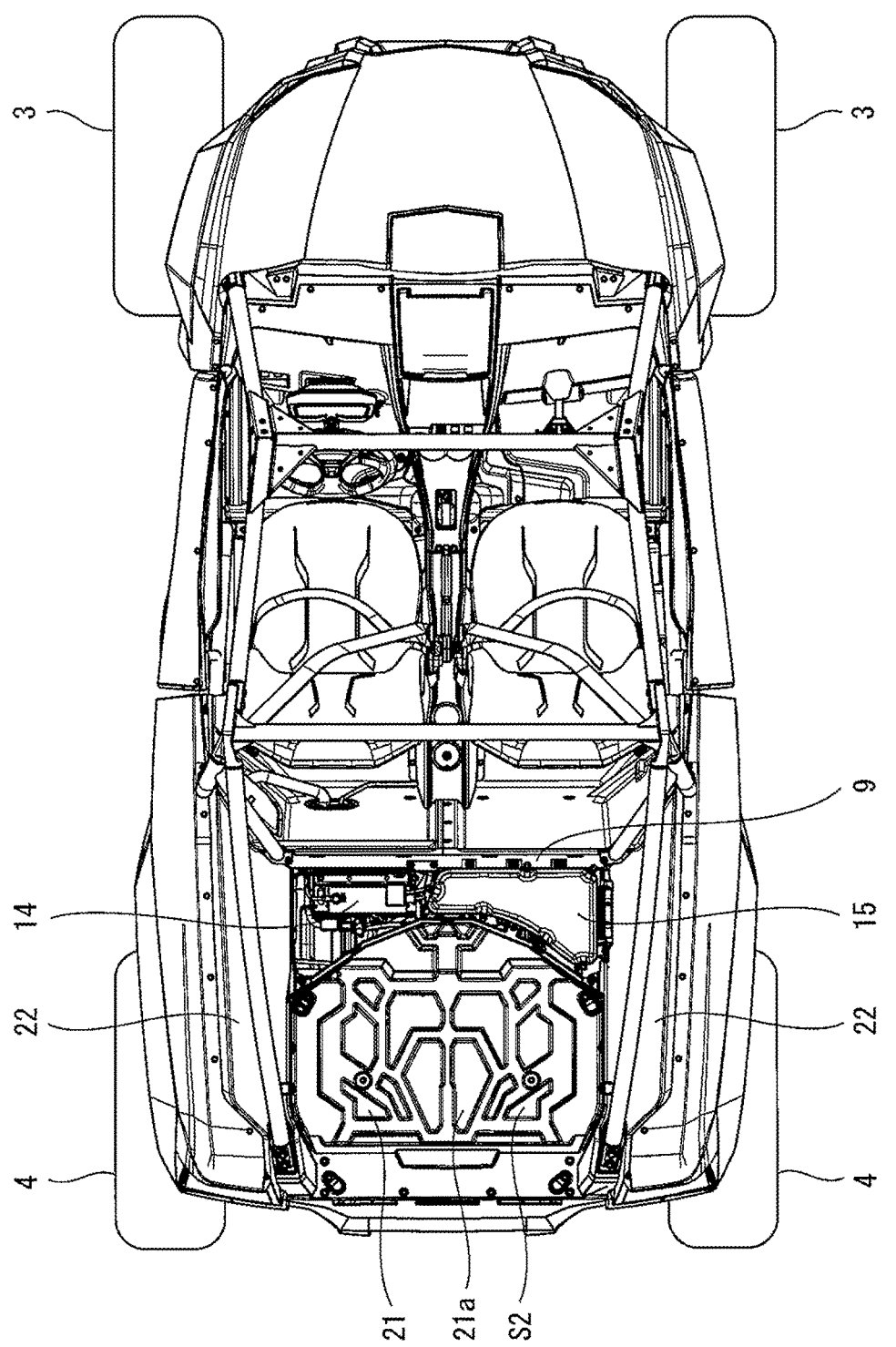
FIG. 9 is a plan view showing a state in which the front carrier member of the vehicle of FIG. 3 is detached.

Next, a maintenance work performed for the vehicle 1 will be described. FIG. 9 is a plan view showing a state in which the front carrier member 23 of the vehicle 1 of FIG. 3 is detached. As shown in FIG. 9, by detaching the front carrier member 23, the battery 14 and the air cleaner box 15 are exposed. In this state, change (exchange) of the battery 14, change of a filter element of the air cleaner box 15, connection of accessory members to the terminals of the battery 14, or the like can be performed. In other words, by merely detaching the front carrier member 23, a user can access the battery 14 and the air cleaner box 15 without disassembling the whole of the cargo carrier 12. The user can perform the maintenance work for the battery 14 or the air cleaner box 15 in a state in which the user gets on the base carrier member 21.

Figure 10:
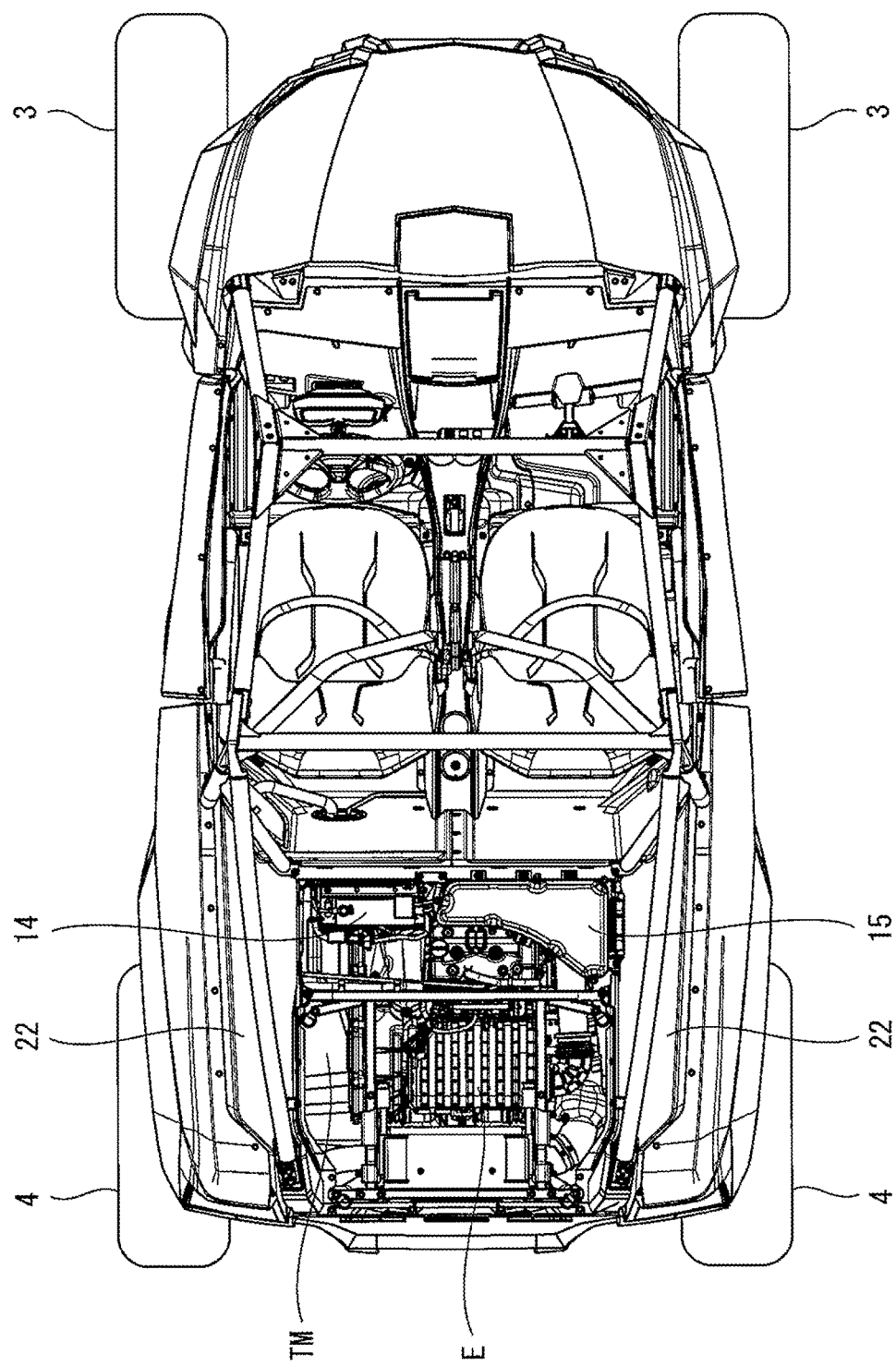
FIG. 10 is a plan view showing a state in which the front carrier member and the base carrier member of the vehicle of FIG. 3 are detached.

FIG. 10 is a plan view showing a state in which the front carrier member 23 and the base carrier member 21 of the vehicle 1 of FIG. 9 are detached. As shown in FIG. 10, by detaching the base carrier member 21 after the front carrier member 23 is detached, the engine E and the CVT TM are exposed. In this state, change (exchange) of a belt of the CVT TM, adjustment of a valve inside a cylinder head cover of the engine E, or the like can be performed. In brief, by detaching the front carrier member 23 and the base carrier member 21 in a state in which the right and left side carrier members 22 are mounted on the right and left rear frame sections 8, respectively, the user can easily access the engine E and the CVT TM without a need to excessively perform a disassembling (dismounting) work.

In the vehicle 1 in which strength of the vehicle body frame 2 is increased by use of the rear gusset frame sections 10, it is necessary to dismount the rear gusset frame sections 10 if the side carrier members 22 should be detached. However, during the maintenance work, it is not necessary to detach the side carrier members 22. As a result, strength of the frame can be increased and the maintenance work can be easily performed.

The base carrier member 21 includes the bottom wall portion 21*a*, the front wall portion 21*b*, and the pair of right and left side wall portions 21*c*, and a separation line of the cargo carrier 12 is not formed in the bottom surface of the loading space S2. In this structure, liquid accumulated in the loading space S2 of the cargo carrier 12 does not easily reach the separation line. A separation line formed between the base carrier member 21 and the side carrier member 22 is formed in the side surface extending vertically rather than a horizontal surface. In this structure, ingress of the liquid into the separation line due to a hydraulic head pressure is not likely to occur. Therefore, the maintenance work can be more easily performed because of the separable structure of the cargo carrier 12, and it becomes possible to prevent ingress of the liquid through the separation line into the space in which the engine E is disposed.

Each of the pair of right and left side wall portions 21*c* of the base carrier member 21 is fastened to the side wall portion 22*a* of corresponding one of the side carrier members 22 in a state in which the side wall portion 21*c* is lapped on the side wall portion 22*a* from the loading space S2 side. Therefore, the base carrier member 21 can be easily detached from the loading space S2 side while maintaining a state in which the side carrier members 22 are fastened to the vehicle body frame 2.

The rear wall portion 23*b* of the front carrier member 23 is mounted on the front wall portion 21*b* of the base carrier member 21, the pair of right and left side wall portions 23*d* of the front carrier member 23 are mounted on the pair of right and left side carrier members 22, respectively, and the separation line of the cargo carrier 12 is not formed in the wall (the upper wall portion 23*a* of the front carrier member 23) of the cargo carrier 12 which is located above the battery 14 and the air cleaner box 15. In this structure, it becomes possible to prevent a situation in which the liquid accumulated in the upper surface of the front carrier member 23 flows through the separation line into the space in which the battery 14 and the air cleaner box 15 are disposed. Further, since the separation line between the rear wall portion 23*b* of the front carrier member 23 and the front wall portion 21*b* of the base carrier member 21 is formed in the surface extending vertically, ingress of the liquid into this separation line due to the hydraulic head pressure is not likely to occur. In this way, ingress of the liquid through the separation line into the space does not occur.

Since the engagement portion 23*ca* provided in the front wall portion 23*c* of the front carrier member 23 is engaged with the cross frame section 9, the front carrier member 23 can be stably supported by the vehicle body frame 2, the front carrier member 23 can be easily removably (detachably) mounted, and the maintenance for the battery 14 and the air cleaner box 15 can be easily performed.

The upper surfaces 31*a* of the plurality of convex portions 31 of the bottom wall portion 21*a* of the base carrier member 21 are horizontal surfaces which are on the same plane, and the bottom surface 30*a* of the depressed (recessed) region 30 of the bottom wall portion 21*a* of the base carrier member 21 is the inclined surface inclined toward the drain hole H. In this structure, stuff (e.g, spare tire) loaded in the loading space S can be horizontally supported on the upper surfaces 31*a* of the plurality of convex portions 31 in the concave/convex structure of the bottom wall portion 21*a* of the base carrier member 21, and the liquid accumulated in the depressed region 30 can be smoothly discharged through the drain hole H.

The front surface (the front wall portion 21*b* and the rear wall portion 23*b*) of the loading space S2 of the cargo carrier 12 has a shape (circular-arc shape) in which it protrudes forward as a whole. Because of this shape, the battery 14 and the air cleaner box 15 can be disposed in front of the loading space S2, and the spare tire and the like of the vehicle 1 can be disposed in the loading space S2. In this way, high space efficiency can be realized.

Figure 11:
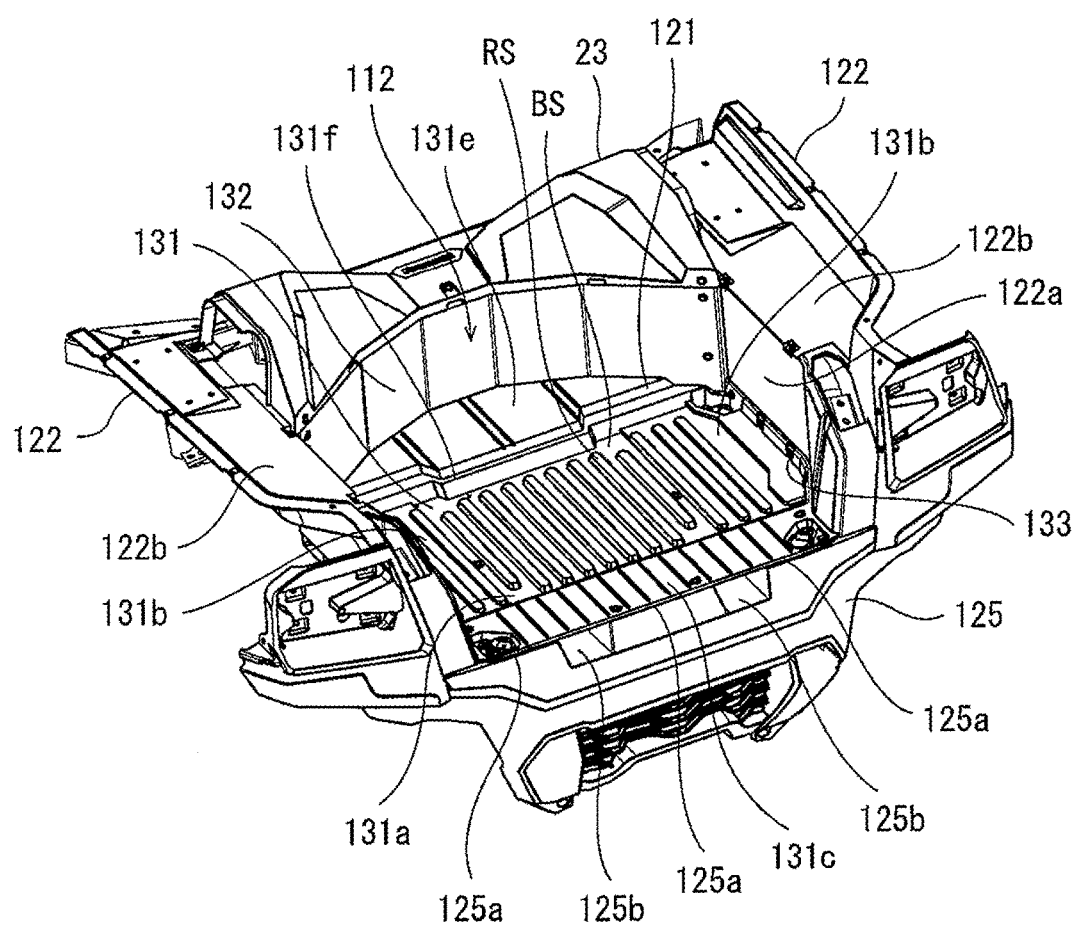
FIG. 11 is a perspective view of a cargo carrier of a side-by-side vehicle according to an embodiment.
Figure 12:
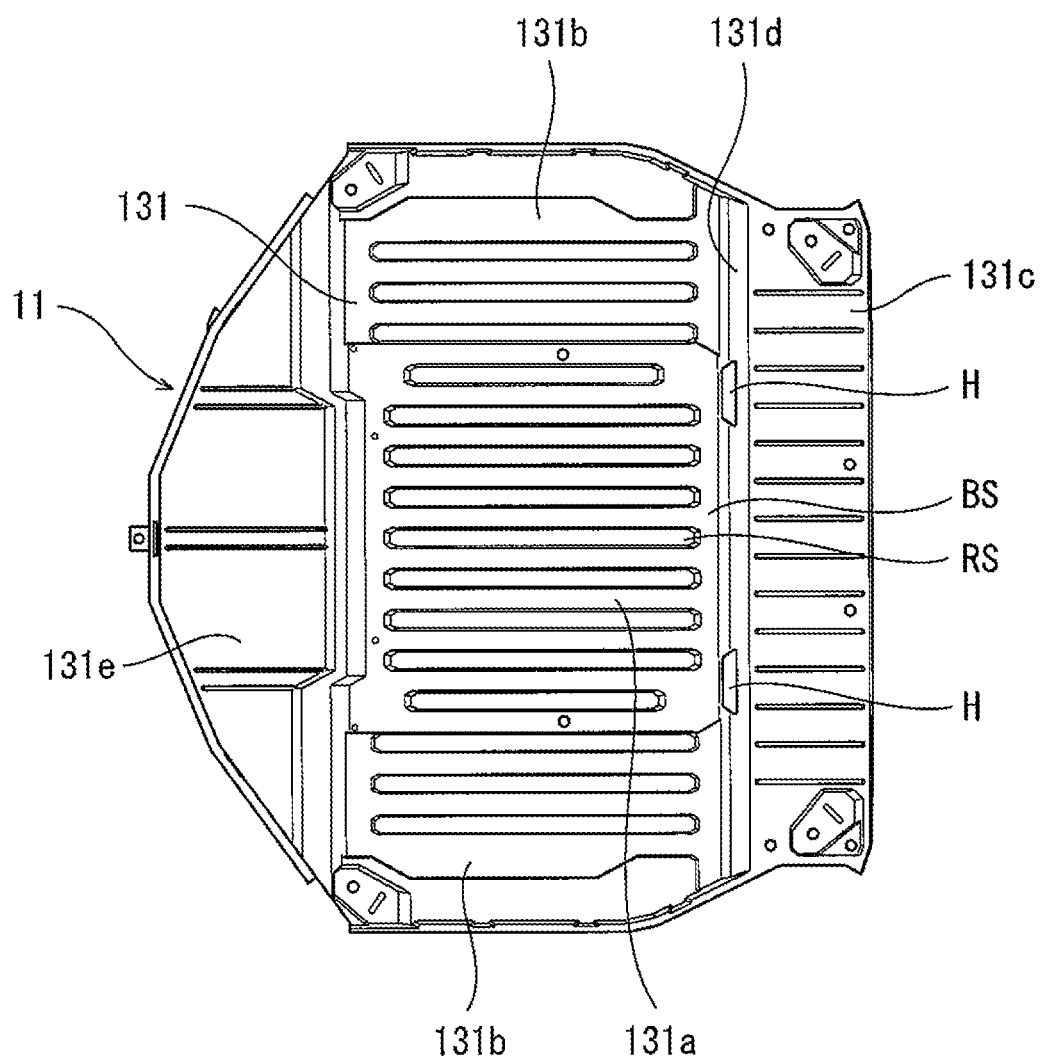
FIG. 12 is a plan view of a base carrier member of the cargo carrier of FIG. 11.
Figure 13:
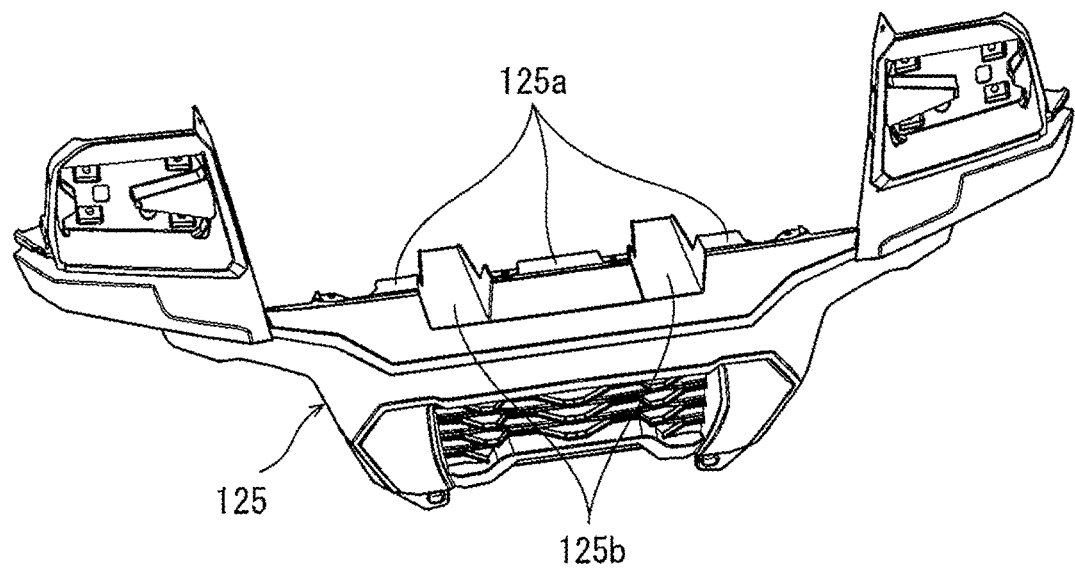
FIG. 13 is a perspective view of a tail cover of FIG. 11.
Figure 14:
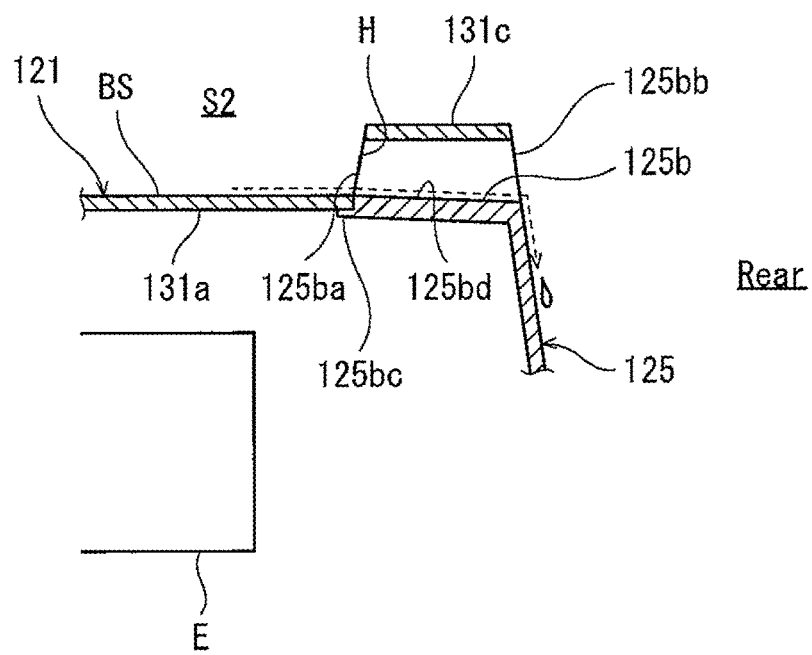
FIG. 14 is a cross-sectional view showing a drain hole of the cargo carrier, and a groove of the tail cover of FIG. 1, when viewed from a vehicle width direction.

FIG. 11 is a perspective view of a cargo carrier 112 of a side-by-side vehicle according to an embodiment. FIG. 12 is a plan view of a base carrier member 121 of the cargo carrier 112 of FIG. 11. FIG. 13 is a perspective view of a tail cover 125 of FIG. 11. FIG. 14 is a cross-sectional view showing a drain hole of the cargo carrier 112, and a groove 125b of the tail cover 125 of FIG. 1, when viewed from the vehicle width direction. In the present embodiment, the structure of the cargo carrier 112 and the structure of the tail cover 125 are different from those of the above-described embodiment. The structures of constituents other than the structure of the cargo carrier 112 and the structure of the tail cover 125 are the same as those of the above-described reference embodiment. Therefore, detailed description is omitted.

As shown in FIG. 11, the cargo carrier 112 has the loading space S2 defined by the bottom surface, the front surface, the left side surface and the right side surface, by joining the base carrier member 121, a pair of right and left side carrier members 122, and the front carrier member 23 to each other. The base carrier member 121 includes a bottom wall 131, a front wall 132, and a pair of side walls 133. The bottom wall 131 defines the bottom surface of the loading space S2.

Each of the pair of right and left side carrier members 122 includes a side wall 122a defining the side surface of the loading space S2, and a shoulder wall 122b protruding laterally from the upper end of the side wall 122a. The upper surface of the shoulder wall 122b is inclined toward the loading space S2. More specifically, the upper surface of the shoulder wall 122b is inclined in the downward direction toward the center in the vehicle width direction. Since the upper surface of the shoulder wall 122b is inclined in the downward direction, the liquid accumulated on the upper surface of the shoulder wall 122b of the cargo carrier 112 falls into the loading space S2 by its own weight. In this way, it becomes possible to prevent accumulation of the liquid on the upper surface of the shoulder wall 122b of the cargo carrier 112.

As shown in FIGS. 11 and 12, the bottom wall 131 includes a center bottom wall portion 131a, a pair of right and left side bottom wall portions 131b, a rear bottom wall portion 131c, a rear protruding wall portion 131d, a front bottom wall portion 131e, and a front protruding wall portion 131f.

The center bottom wall portion 131a is formed in a region including a center portion of the bottom wall 131. The center bottom wall portion 131a has a bottom surface which is lowest in the bottom wall 131. The pair of right and left side bottom wall portions 131b are provided on the sides of the center bottom wall portion 131a (outward of the center bottom wall portion 131a in the vehicle width direction). The pair of right and left side bottom wall portions 131b are higher than the center bottom wall portion 131a. In this configuration, the liquid accumulated in the side bottom wall portions 131b flows to the center bottom wall portion 131a by its own weight. The liquid is quickly discharged through drain holes H which will be described later before a large quantity of liquid is accumulated in the loading space S2. The pair of right and left side bottom wall portions 131b are lower than the rear bottom wall portion 131c and the front bottom wall portion 131e.

The center bottom wall portion 131a and the pair of right and left side bottom wall portions 131b include a bottom surface BS and rib surfaces Rs partially protruding upward from the bottom surface BS. In this configuration, a luggage accommodated in the loading space S2 of the cargo carrier 112 and placed on the center bottom wall portion 131a or the side bottom wall portion 131b is supported on the rib surfaces RS and located above the bottom surface BS. This makes it possible to prevent a situation in which the liquid accumulated on the bottom surface BS of the center bottom wall portion 131a or the side bottom wall portion 131b adheres to the luggage.

The rear bottom wall portion 131c is provided rearward of the center bottom wall portion 131a and the pair of right and left side bottom wall portions 131b. The rear bottom wall portion 131c is higher than the center bottom wall portion 131a and the pair of right and left side bottom wall portions 131b. The rear bottom wall portion 131c forms the rear end of the bottom wall 131 and has a laterally elongated shape (is elongated in the vehicle width direction). The rear protruding wall portion 131d protrudes upward from the rear end of the center bottom wall portion 131a and is connected to the front end of the rear bottom wall portion 131c. In other words, the center bottom wall portion 131a and the rear bottom wall portion 131c are connected to each other via the rear protruding wall portion 131d. The rear protruding wall portion 131d extends laterally (in the vehicle width direction) along the center bottom wall portion 131a and the rear bottom wall portion 131c. The rear protruding wall portion 131d is inclined in an upward direction and in a rearward direction.

The front bottom wall portion 131e is provided forward (in front of) the center bottom wall portion 131a and the pair of right and left side bottom wall portions 131b. The front bottom wall portion 131e is higher than the center bottom wall portion 131a and the pair of right and left side bottom wall portions 131b. More specifically, the front bottom wall portion 131e is substantially as high as the rear bottom wall portion 131c. In this configuration, the front portion of the bottom wall 131 is located to be higher. This can increase a space in the front portion of the cargo carrier 112 in a height (vertical) direction. In this space, members (e.g., duct) can be easily placed. The front bottom wall portion 131e forms the front end of the bottom wall 131 and has a laterally elongated shape (is elongated in the vehicle width direction). The front protruding wall portion 131f protrudes upward from the front end of the center bottom wall portion 131a and is connected to the rear end of the front bottom wall portion 131e. The front protruding wall portion 131f is inclined in the upward direction and in the forward direction.

The rear protruding portion 131d of the bottom wall 131 of the base carrier member 121 is formed with a plurality of (e.g., a pair of right and left) drain holes H. The lower edges of the drain holes H are continuous with the bottom surface BS of the center bottom wall portion 131a. Through the drain holes H, the space formed above the center bottom wall portion 131a is in communication with the space formed under the rear bottom wall portion 131c. Note that the drain holes H are located rearward of the engine E.

As shown in FIGS. 11 and 13, the tail cover 125 is disposed under the rear bottom wall portion 131c of the bottom wall 131 of the base carrier member 121. The tail cover 125 is supported by the cargo carrier 112 or the vehicle body frame 2. The tail cover 125 includes a plurality of support portions 125a which are in contact with the lower surface of the rear bottom wall portion 131c from below, and a plurality of (e.g., a pair of right and left) grooves 125b extending in the forward and rearward direction at locations that are below the rear bottom wall portion 131c. The grooves 125b correspond to the drain holes H, respectively.

As shown in FIG. 14, a front opening 125ba of each of the grooves 125b of the tail cover 125 is in communication with the drain hole H, while a rear opening 125bb of the groove 125b opens rearward (outside the vehicle). The front end portion of the groove 125b of the tail cover 125 includes a protruding portion 125bc protruding forward from the lower portion of the front end portion of the groove 125b. The protruding portion 125bc protrudes more forward than the drain hole H and is in contact with the rear end portion of the center bottom wall portion 131a from below. In this configuration, the liquid discharged in the rearward direction from the loading space S of the cargo carrier 112 through the drain hole H is properly led to the groove 125b of the tail cover 125. A bottom surface 125bd of the tail cover 125 is inclined in the rearward direction and in the downward direction. The liquid present in the groove 125bd of the tail cover 125 flows in the rearward direction by its own weight and is discharged smoothly to a region outside the vehicle through the rear opening 125bb.

In accordance with the above-described configuration, the liquid accumulated in the loading space S2 of the cargo carrier 112 is discharged in the rearward direction through the drain holes H formed in the rear protruding wall portion 131d provided rearward of the center bottom wall portion 131a. The liquid accumulated in the loading space S2 of the cargo carrier 112 is discharged to a region that is rearward of the engine E, and does not adhere onto the engine E. The liquid discharged from the loading space S2 of the cargo carrier 112 through the drain holes H is led in the rearward direction through the grooves 125b of the tail cover 125 and discharged to the region outside the vehicle. In this way, the liquid can be discharged in the rearward direction to the region that is sufficiently distant from the engine E.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention. For example, although the cargo carrier 12 includes the four members which are separable from each other, the cargo carrier 12 may include five or more members which are separable from each other. In the configuration of FIG. 11, the cargo carrier 112 does not necessarily include a plurality of separate members. Further, although the vehicle 1 includes the engine E which is an internal combustion engine as the driving power unit which generates the driving power for allowing the vehicle 1 to travel, the vehicle 1 may include an electric motor instead of the engine E.

What is claimed is:

1. A side-by-side vehicle comprising:
    a vehicle body frame including a cabin frame section surrounding a riding space in which seats for a driver and a passenger are provided, and a rear frame section disposed rearward of the cabin frame section;
    a driving power unit supported by the vehicle body frame; and
    a cargo carrier which is disposed above the driving power unit in a state in which the cargo carrier is supported by the rear frame section, and has a loading space with a depressed shape,
    wherein the cargo carrier includes a bottom wall defining a bottom surface of the loading space,
    wherein the bottom wall includes a center bottom wall portion, a rear bottom wall portion provided rearward of the center bottom wall portion and configured to be higher than the center bottom wall portion, and a protruding wall portion protruding upward from a rear end of the center bottom wall portion and connected to a front end of the rear bottom wall portion, and
    wherein the protruding wall portion is provided with a drain hole through which a space formed above the center bottom wall portion is in communication with a space formed under the rear bottom wall portion.

2. The side-by-side vehicle according to claim 1, further comprising:
    a tail cover disposed under the rear bottom wall portion of the cargo carrier,
    wherein the tail cover includes a support portion supporting a lower surface of the rear bottom wall portion from below, and a groove extending in a forward and rearward direction at a location that is below the rear bottom wall portion, and
    wherein a front opening of the groove is in communication with the drain hole and a rear opening of the groove opens in a rearward direction.

3. The side-by-side vehicle according to claim 2,
    wherein a bottom surface of the groove of the tail cover is inclined in the rearward direction and in a downward direction.

4. The side-by-side vehicle according to claim 2,
    wherein a front end portion of the groove of the tail cover includes a protruding portion which protrudes more forward than the drain hole and is in contact with a rear end portion of the center bottom wall portion from below.

5. The side-by-side vehicle according to claim 1,
    wherein the bottom wall includes a side bottom wall portion which is provided outward of the center bottom wall portion in a vehicle width direction, the side bottom wall portion being higher than the center bottom wall portion and lower than the rear bottom wall portion.

6. The side-by-side vehicle according to claim 1,
    wherein the bottom wall includes a front bottom wall portion which is provided forward of the center bottom wall portion and is substantially as high as the rear bottom wall portion.

7. The side-by-side vehicle according to claim 1,
    wherein the cargo carrier includes a side wall defining a side surface of the loading space and a shoulder wall protruding laterally from an upper end of the side wall, and
    wherein an upper surface of the shoulder wall is inclined in a downward direction toward the loading space.

8. The side-by-side vehicle according to claim 1,
    wherein the center bottom wall portion includes a bottom surface which is continuous with a lower edge of the drain hole, and a rib surface partially protruding upward from the bottom surface.

* * * * *